Figure 1:
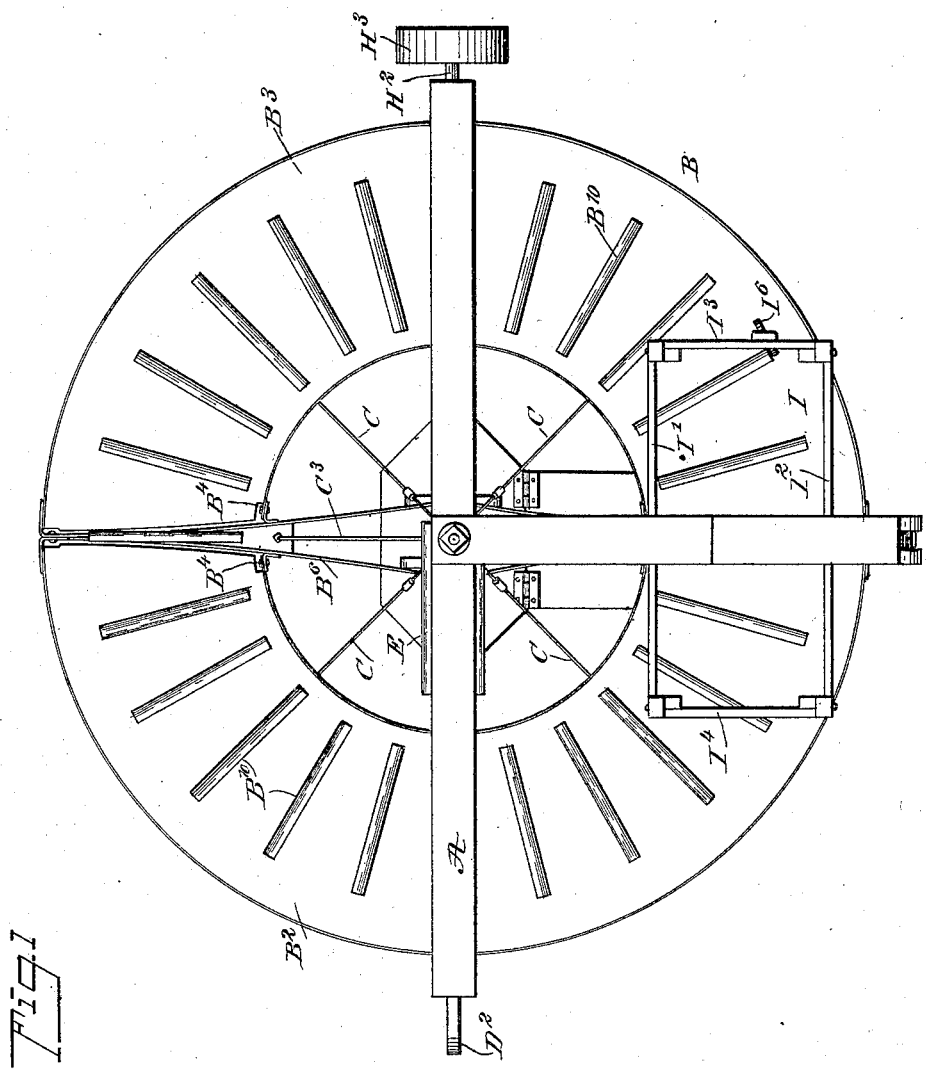

No. 726,454. PATENTED APR. 28, 1903.
E. PARKER.
TREAD POWER MOTOR.
APPLICATION FILED MAR. 11, 1902.
NO MODEL. 4 SHEETS—SHEET 1.

WITNESSES:

INVENTOR
Ezra Parker
BY
ATTORNEYS

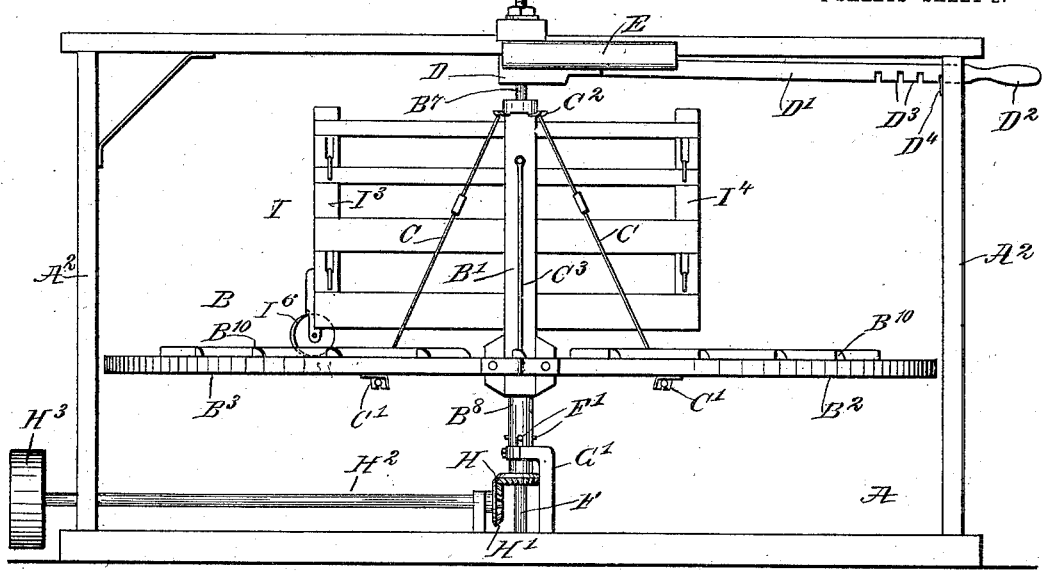

No. 726,454. PATENTED APR. 28, 1903.
E. PARKER.
TREAD POWER MOTOR.
APPLICATION FILED MAR. 11, 1902.
NO MODEL. 4 SHEETS—SHEET 3.
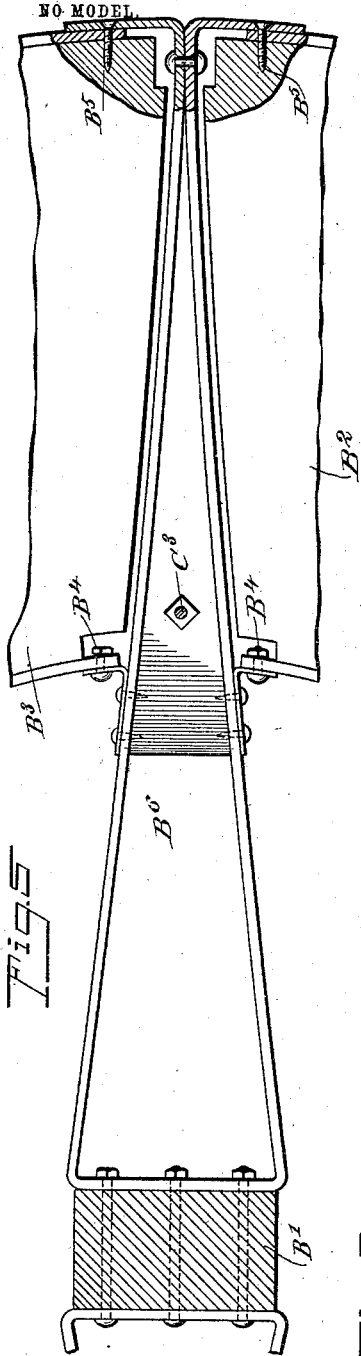
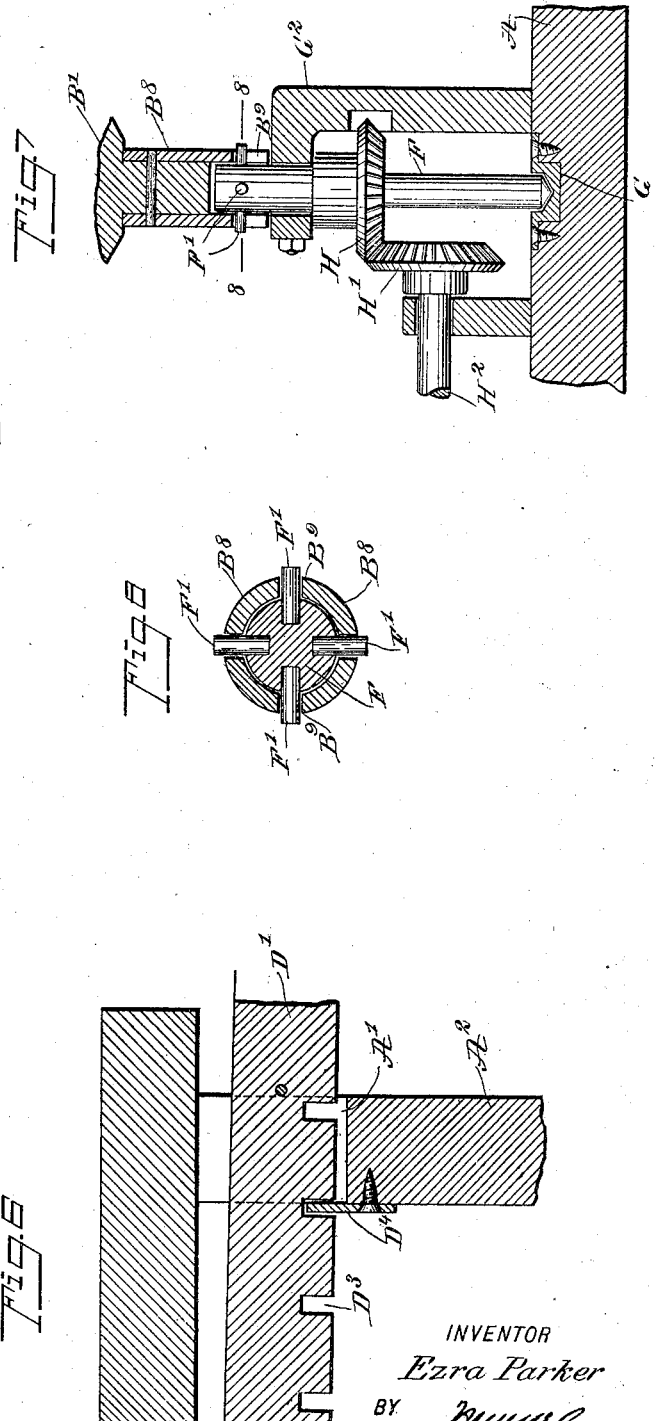
WITNESSES:
INVENTOR
Ezra Parker
BY
ATTORNEYS No. 726,454. PATENTED APR. 28, 1903.
E. PARKER.
TREAD POWER MOTOR.
APPLICATION FILED MAR. 11, 1902.
NO MODEL. 4 SHEETS—SHEET 4.
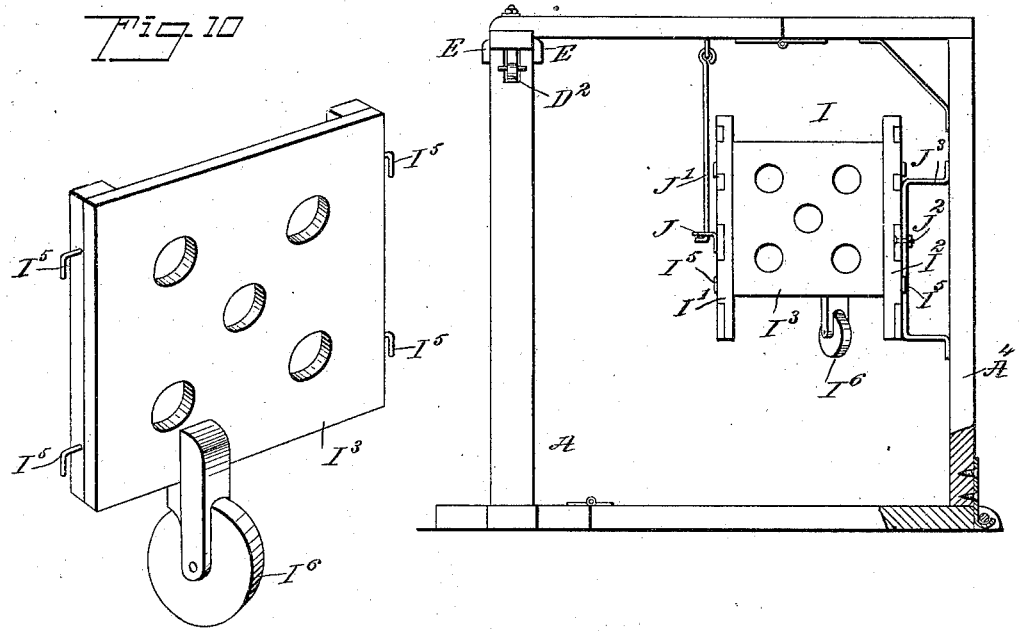
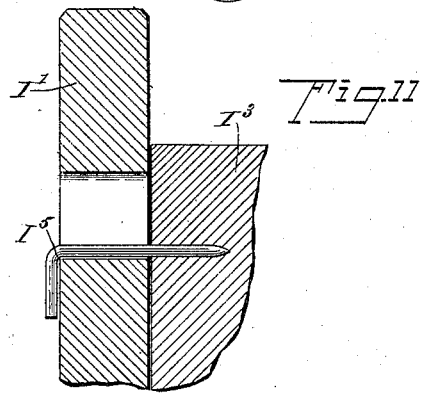
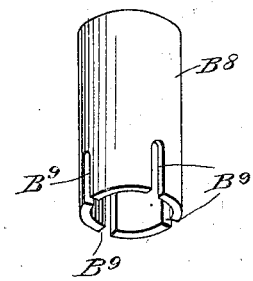
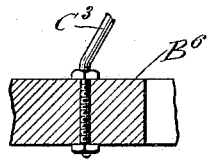
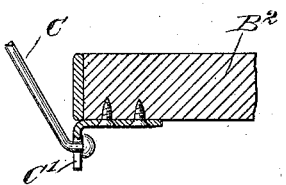
WITNESSES:
INVENTOR
Ezra Parker
BY
ATTORNEYS

UNITED STATES PATENT OFFICE.

EZRA PARKER, OF CUMBERLAND, IOWA.

TREAD-POWER MOTOR.

SPECIFICATION forming part of Letters Patent No. 726,454, dated April 28, 1903.

Application filed March 11, 1902. Serial No. 97,713. (No model.)

*To all whom it may concern:*

Be it known that I, EZRA PARKER, a citizen of the United States, and a resident of Cumberland, in the county of Cass and State of Iowa, have invented a new and Improved Tread-Power Motor, of which the following is a full, clear, and exact description.

The object of the invention is to provide a new and improved tread-power motor arranged to permit of conveniently changing the inclination of the tread-wheel to utilize the animal's power to the fullest advantage for various kinds of work without requiring undue exertion to run the motor powerfully at a slow speed or with less power at high speed.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement. Fig. 2 is a rear elevation of the same. Fig. 3 is an enlarged sectional side elevation of the upper end of the tread-wheel shaft and its adjustable bearing. Fig. 4 is a transverse section of the adjustable bearing on the line 4 4 of Fig. 3. Fig. 5 is an enlarged plan view of parts of the tread-wheel, portions being in section. Fig. 6 is an enlarged sectional side elevation of the locking device for the adjustable bearing. Fig. 7 is an enlarged sectional side elevation of the power-transmitting gear. Fig. 8 is a sectional plan view of the same on the line 8 8 of Fig. 7. Fig. 9 is an end elevation of the stall and the frame supporting the stall, parts of the frame being shown in section. Fig. 10 is an enlarged perspective view of the head of the stall. Fig. 11 is a transverse section showing the connection between the head and rail of the stall. Fig. 12 is a perspective view of the ferrule on the lower end of the tread-wheel shaft. Fig. 13 is a sectional side elevation of part of the tread-wheel beam and its brace, and Fig. 14 is a transverse section of part of the platform and its brace.

The improved tread-power motor is mounted on a suitably-constructed frame A and is provided with a tread-wheel B, having a shaft $B'$ and a platform, preferably made in two segmental sections $B^2 B^3$, each hinged at each end at $B^4 B^5$ to a beam $B^6$, secured to and extending horizontally from the shaft $B'$. (See Figs. 1 and 5.) The platform-sections $B^2 B^3$ are normally supported in proper position by braces C, removably engaging keepers or brackets $C' C^2$, secured on the platform-sections and the shaft $B'$, respectively, as shown in Figs. 1, 3, and 14. Rigid braces $C^3$ connect the beam $B^6$ with the shaft $B'$. (See Figs. 2, 5, and 13.)

Now by the arrangement described the platform-braces C can be removed to allow folding of the platform-sections, so that the latter take up very little room when transporting or storing the machine. The platform-braces are preferably made in sections, connected with each other by turnbuckles to allow of shortening and lengthening the braces to hold the platform-sections in the proper position.

The upper end of the shaft $B'$ is provided with a journal $B^7$, engaging a bearing D, mounted to slide in a horizontal direction on a guideway E, secured to the top of the frame A, as plainly shown in Figs. 1, 2, 3, and 4. The bearing D is pivotally connected with a shifting rod $D'$, extending through an opening $A'$ in one of the uprights $A^2$ of the main frame, (see Fig. 6,) and the outer end of this shifting rod $D'$ is provided with a handle $D^2$, adapted to be taken hold of by the operator for moving the bearing D along the guideway E, so as to give the desired inclination to the shaft $B'$, and consequently to the entire tread-wheel B, according to the work to be performed.

In order to lock the shifting rod $D'$ and bearing D in position after the desired adjustment is made, I provide the shifting rod $D'$ with a series of spaced notches $D^3$, adapted to engage a keeper $D^4$, secured to the upright $A^2$. (See Figs. 2 and 6.)

It is understood that when the operator desires to shift the position of the bearing D for the purpose mentioned then the operator first lifts the handle $D^2$, so as to disengage the notch $D^3$ from the keeper $D^4$ to allow of moving the rod $D'$ lengthwise until the bearing D is in the desired position. The operator then moves the handle $D^2$ downward to engage the inner notch $D^3$ with the keeper $D^4$.

The lower end of the shaft $B'$ is provided with a ferrule $B^8$, (see Figs. 2, 7, 8, and 12,) and the lower end of this ferrule is provided with slots $B^9$, extending lengthwise of the ferrule and engaging pins $F'$, extending radially from the upper end of the transmitting-shaft F, set at its lower end in a step G and journaled near its upper end in a suitable bearing $G'$, secured to the base of the frame A the same as the step G. On the shaft F is secured a beveled gear-wheel H in mesh with a beveled gear-wheel $H'$, secured on the power-shaft $H^2$, journaled in suitable bearings attached to the frame A, and on the outer end of the said shaft $H^2$ is secured a pulley $H^3$, connected by belt with other machinery for imparting rotary motion to the same whenever the tread-wheel is rotated by the animal treading the platform.

Now by the arrangement shown the lower end of the shaft $B'$ has a self-adjusting connection with the upper end of the transmitting-shaft F, so that when the bearing D is shifted the shaft $B'$ can readily assume an inclined position without crowding or binding on the upper end of the transmitting-shaft F. Furthermore, when the tread-wheel is rotated the shaft $B'$ by the ferrule $B^8$ engaging the pins $F'$ imparts a positive rotary motion to the transmitting-shaft F, geared to the power-shaft $H^2$ to rotate the latter. A stall I for the animal is supported above the platform and is hung on the main frame A in such a manner that the stall can assume the same angular position as the platform. The stall I is of a knockdown construction and consists, essentially, of the side rails $I'$ $I^2$ and the ends or heads $I^3$ $I^4$, of which the heads $I^3$ and $I^4$ are provided with transversely-extending hooks $I^5$ for hooking onto the side rails $I'$, as will be readily understood by reference to Figs. 9, 10, and 11. The forward head $I^3$ is provided on its lower end with a roller $I^6$, adapted to travel on the platform of the tread-wheel. (See Fig. 2.) The inner side rail $I'$ is provided with a bracket J, having a pivot connection with the lower end of a rod $J'$, suspended from the top of the frame A, (see Fig. 9,) and the outer rail $I^2$ is connected by a pivot $J^2$ with a bracket $J^3$, secured to the upright $A^4$ of the main frame. The bracket J and pivot $J^2$ are located opposite each other at the middle of the rails $I'$ and $I^2$, so that the stall can be readily swung into an angular position to keep the roller $I^6$ at all times in contact with the top of the platform—that is, the stall standing in the same inclined position as the platform. The frame A is preferably of a knockdown construction, so as to take up very little space when folding up for transporting or storing purposes. The platform-sections are provided on top with the usual cleats $B^{10}$ to give a good stepping hold to the animal in the stall I.

Having thus described my invention, I claim as new and desire to secure by Letters Patent—

1. A tread-power motor, having a tread-wheel, means for setting the tread-wheel in an inclined position, a framework, a stall pivoted on the framework above the platform of the said tread-wheel, and a roller journaled on the said stall, and adapted to travel on the said platform, as set forth.

2. A tread-power motor, having a tread-wheel comprising a shaft, a diametrically-extending beam secured to the said shaft, and two segmental platform-sections one on each side of the said beam and hinged thereto, as set forth.

3. A tread-power motor, having a tread-wheel comprising a shaft, a diametrically-extending beam secured to the said shaft, two segmental platform-sections one on each side of the said beam and hinged thereto, and braces connecting the platform-sections to the said shaft, as set forth.

4. A tread-power motor, having a tread-wheel comprising a shaft, a diametrically-extending beam secured to the said shaft, two segmental platform-sections one on each side of the said beam and hinged thereto, and braces connecting the platform-sections to the said shaft, the said braces being removably connected with the said platform and shaft, as set forth.

5. In a tread-power motor, the combination with a supporting-frame, a tread-wheel mounted therein, and means for moving the tread-wheel into angular position, of a stall having a pivotal connection at one side with an upright of the frame, and a rod suspended from the top of the frame and pivotally connected with the other side of the stall, as set forth.

6. A tread-power motor, comprising a frame, a sliding bearing in the upper part of the frame, means for adjusting the bearing, a tread-wheel having the upper end of its shaft mounted in said bearing, a slotted ferrule on the lower end of the tread-wheel shaft, a vertical transmitting-shaft mounted in the frame below the tread-wheel shaft, said vertical shaft having its upper end projecting into the said ferrule and provided with laterally-projecting pins extending into the slots of the same, a horizontal power-shaft, and gear-wheels on the transmitting and power shafts and meshing with each other, as set forth.

In testimony whereof I have signed my name to this specification in the presence of two subscribing witnesses.

EZRA PARKER.

Witnesses:
GUS LINDEMAN,
M. D. PORTER.